(12) United States Patent
Hara et al.

(10) Patent No.: US 7,621,807 B2
(45) Date of Patent: Nov. 24, 2009

(54) FIXING MECHANISM FOR A CONTAINER IN A VEHICLE AIR CONDITIONING DEVICE

(75) Inventors: Shinichi Hara, Le Mesnil St Denis Cedex (FR); Akihiko Yoshida, Le Mesnil St Denis Cedex (FR); Takao Koike, Le Mesnil St Denis Cedex (FR)

(73) Assignee: Valeo Systemes Thermiques S.A.S., Le Mesnil Saint Denis (FR)

( * ) Notice: Subject to any disclaimer, the term of this patent is extended or adjusted under 35 U.S.C. 154(b) by 424 days.

(21) Appl. No.: 11/325,580

(22) Filed: Jan. 4, 2006

(65) Prior Publication Data
US 2008/0020699 A1    Jan. 24, 2008

(30) Foreign Application Priority Data
Jan. 4, 2005    (JP) .............................. 2005-000217

(51) Int. Cl.
*B60H 3/00* (2006.01)
*B60H 1/00* (2006.01)
*F24F 3/12* (2006.01)
(52) U.S. Cl. ...................... 454/156; 454/143; 454/157; 422/122
(58) Field of Classification Search .................. 454/156, 454/157, 158, 143; 422/122
See application file for complete search history.

(56) References Cited

U.S. PATENT DOCUMENTS 3,825,410 A * 7/1974 Bagshawe ................... 436/57
4,272,478 A * 6/1981 Vihko .......................... 422/57
5,447,693 A * 9/1995 Ohta et al. .................. 422/122
6,280,316 B1 * 8/2001 Loup .......................... 454/158

FOREIGN PATENT DOCUMENTS

| JP | 63075430 | 4/1988 |
|---|---|---|
| JP | 11211126 A | 8/1999 |
| JP | 2000-088270 A | 3/2000 |

(Continued)

OTHER PUBLICATIONS

English language translation and abstract for JP 11-211126, extracted from PAJ database, dated Sep. 9, 2008, 22 pages.

(Continued)

*Primary Examiner*—Steven B McAllister
*Assistant Examiner*—Patrick F. O'Reilly, III
(74) *Attorney, Agent, or Firm*—Howard & Howard Attorneys PLLC

(57) ABSTRACT

The purpose of the present invention is to satisfy the following: (1) it prevents the adsorption of antibacterial agent to the filter during storage, (2) for this reason, makes the container and the filter separable and furthermore makes it easy to fix the container, and (3) makes it possible to change the filter and the antibacterial agent respectively separately with simple operations. The fixing mechanism of the container in which an antibacterial agent has been sealed according to the present invention is a fixing mechanism for a container in which an antibacterial agent is sealed in a vehicle air conditioning device. And, fixing means 53 are provided for removably fixing the container 31 to the lid 51 which opens and closes the inlet/outlet port 50 of the filter unit 30.

8 Claims, 5 Drawing Sheets

FOREIGN PATENT DOCUMENTS

| | | | |
|---|---|---|---|
| JP | 2003-246215 A | | 9/2003 |
| JP | 2003246215 A | * | 9/2003 |
| JP | 2004-210087 A | | 7/2004 |
| JP | 2004210087 A | * | 7/2004 |
| JP | 2005-219562 A | | 8/2005 |
| JP | 2005219562 A | * | 8/2005 |
| WO | WO 2005009493 A1 | * | 2/2005 |
| WO | WO 20051009493 A1 | | 2/2005 |

OTHER PUBLICATIONS

English language translation and abstract for JP 2000-088270, extracted from PAJ database, dated Sep. 9, 2008, 31 pages.

English language translation and abstract for JP 2003-246215, extracted from PAJ database, dated Mar. 16, 2009, 35 pages.

English language translation and abstract for JP 2004-210084, extracted from PAJ database, dated Mar. 16, 2009, 41 pages.

English language translation and abstract for JP 2005-219562, extracted from PAJ database, dated Mar. 16, 2009, 59 pages.

English language abstract for JP63075430 extracted from espacenet.com Sep. 30, 2008.

* cited by examiner

[Figure 1]
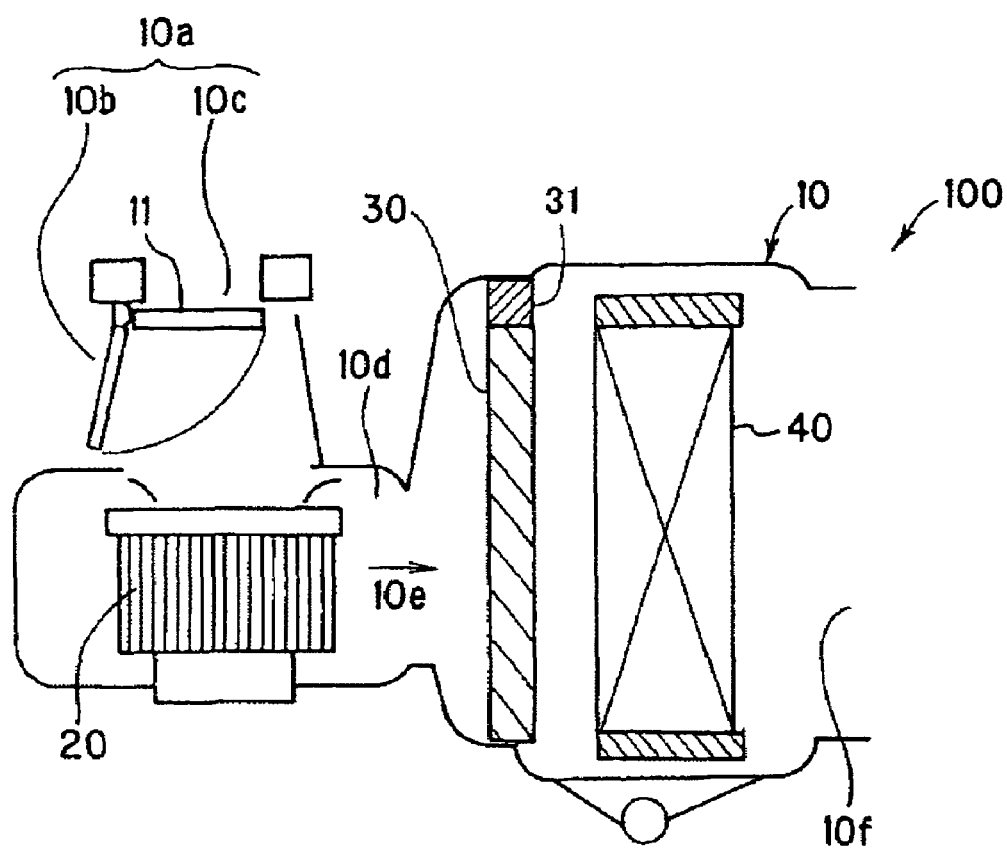

[Figure 2]
(a)
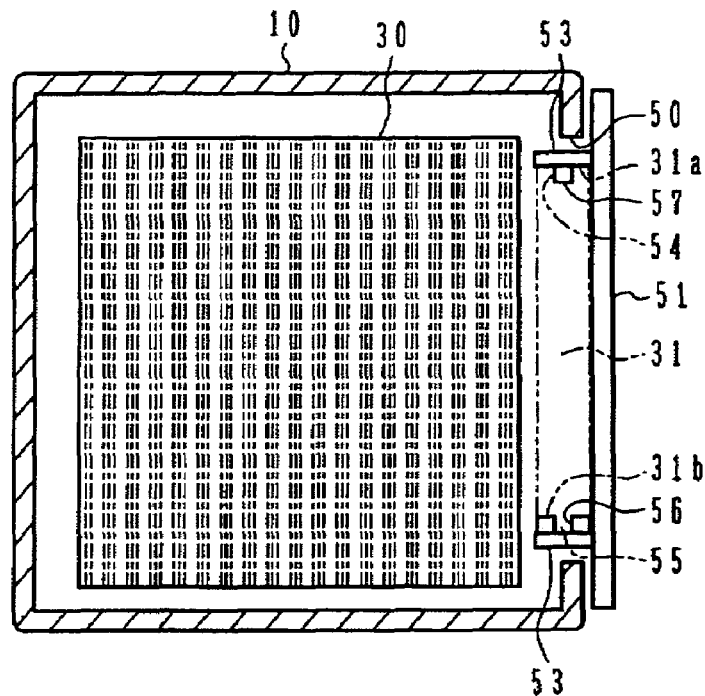
(b)
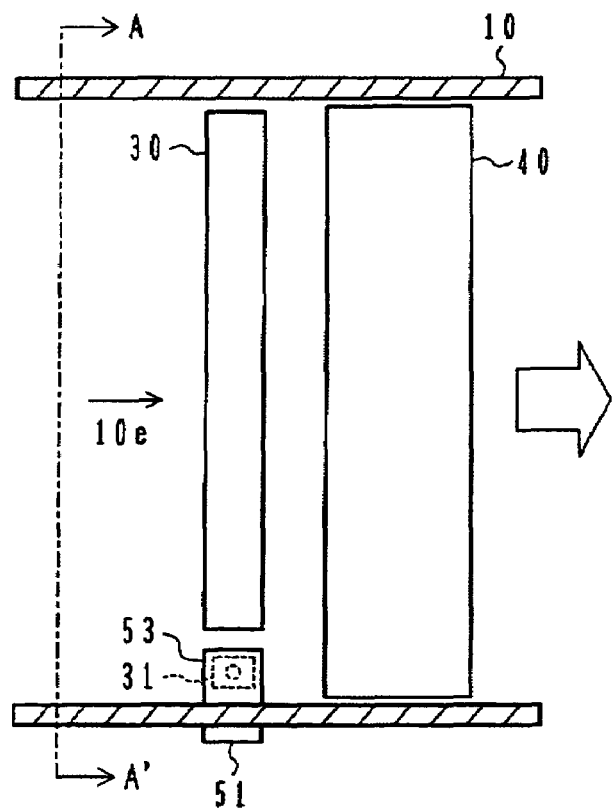

[Figure 3]
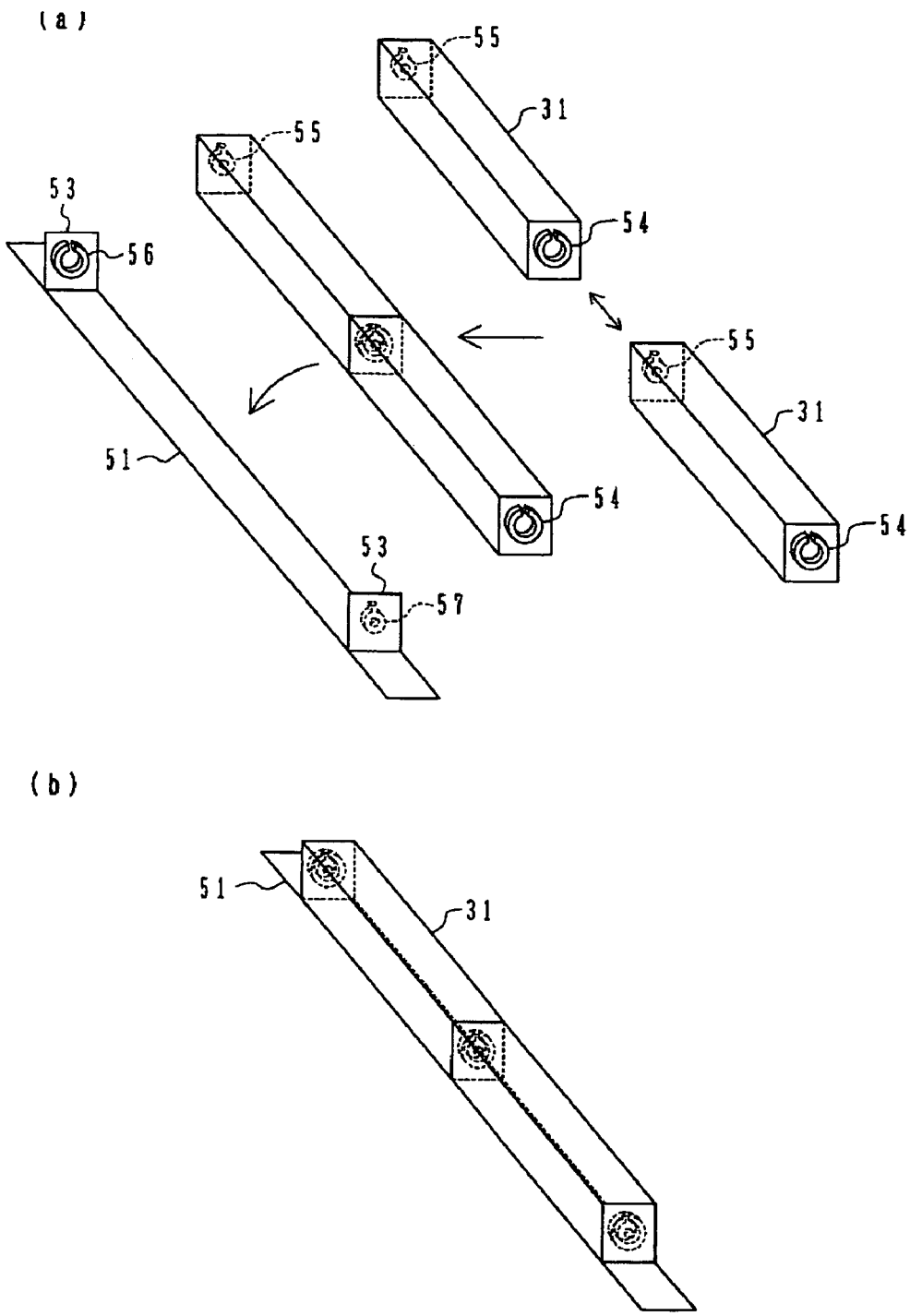

[Figure 4]
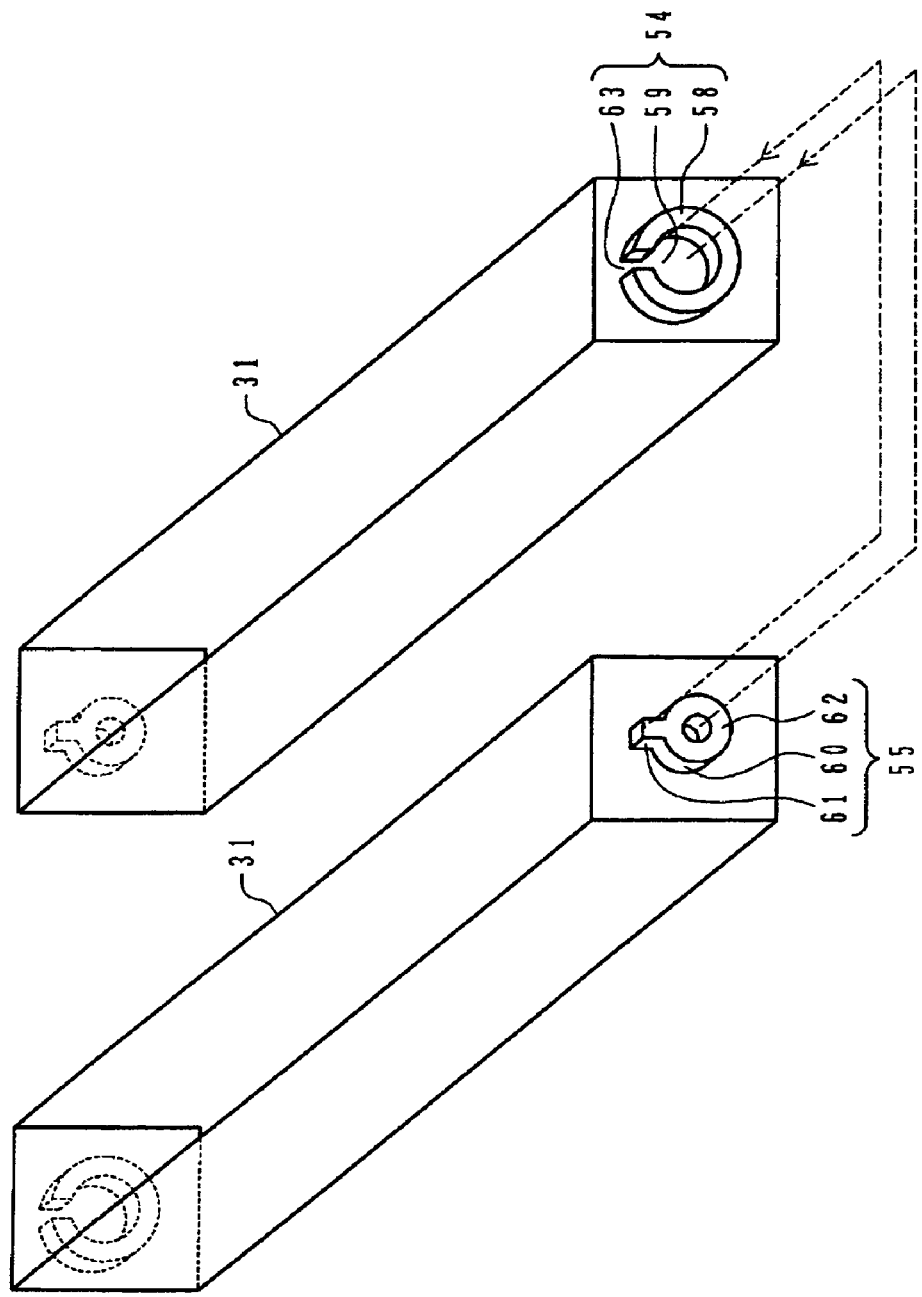

[Figure 5]
(a)
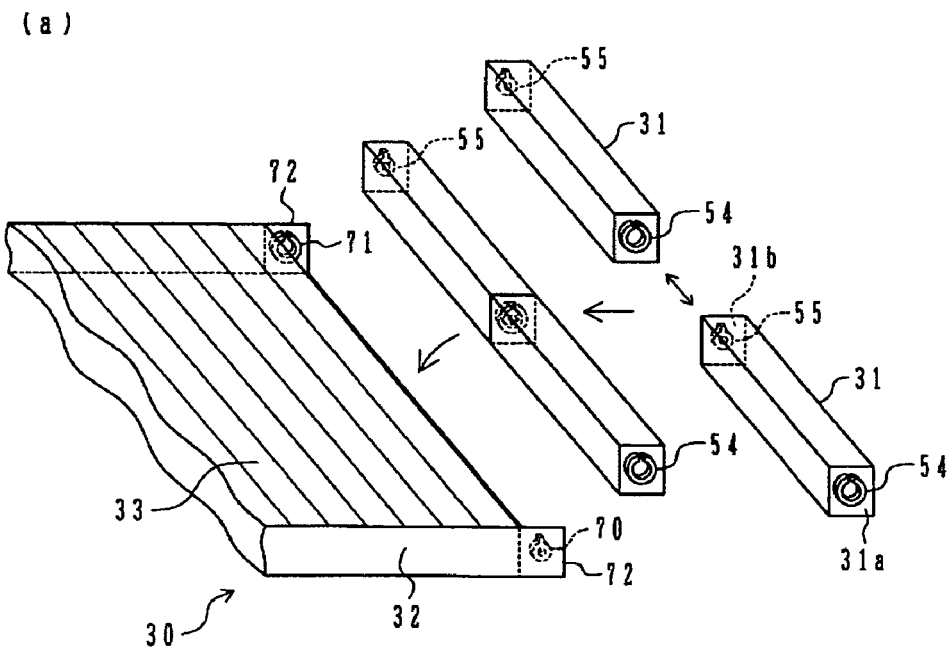
(b)
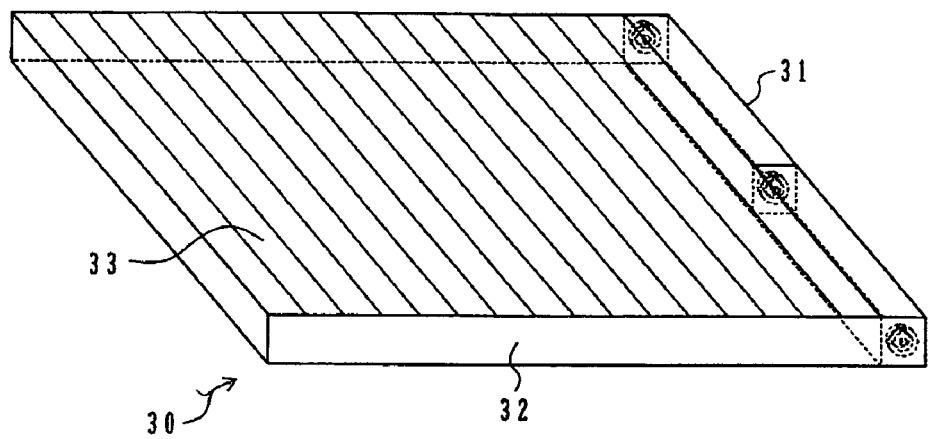

FIXING MECHANISM FOR A CONTAINER IN A VEHICLE AIR CONDITIONING DEVICE

TECHNICAL FIELD

The present invention relates to a fixing mechanism for a container in which an antibacterial agent is sealed, arranged in the air passage of a vehicle air conditioning device which has the function of preventing the proliferation of microorganisms in the evaporator and in areas around it and to a container therefor.

PRIOR ART

The activity of microorganisms such as the proliferation of bacteria inside air conditioners causes unpleasant odors to be generated by air conditioners for motor vehicles. The inside of an air conditioner is an environment which favors bacterial proliferation on account of the condensation generated from the evaporator core. Antibacterial treatment inside the unit and drying have been considered as measures to prevent the proliferation of microorganisms.

There have been many trials of methods of compounding antibacterial agents into the resins inside air conditioners, but there are problems in that when dust accumulates on the antibacterial agents, the effect thereof is lost. In this regard, it has been proposed to use a volatile antibacterial agent as a counter measure (see, for example, Patent Literature 1, 2 or 3).

[Patent Literature 1] Japanese Laid-Open Patent Application H11-211126

[Patent Literature 2] Japanese Laid-Open Patent Application 2000-88270

[Patent Literature 3] Japanese Published Patent Application H6-78821

DISCLOSURE OF THE INVENTION

[Problems to be Solved by the Invention]

In these prior art techniques a volatile antibacterial agent is placed inside the air conditioner, but when it is provided inside an air conditioner for a motor vehicle, the volatile weight increases because temperatures in the region of 50° C. are reached in the air conditioner in summer, and no consideration has been given to the fact that the life of the antibacterial agent is shortened.

In this regard, it has become clear that if a system is employed using polypropylene as the material for the container for the antibacterial agent, and using isothiocyanates, in particular allyl isothiocyanate (AIT) as the antibacterial agent inside the HVAC, the antibacterial agent passes through polypropylene to produce an antibacterial effect.

However, when an antibacterial agent is integrated into the filter of a vehicle air conditioning device and the assembly is wrapped in a gas barrier film such as an aluminum evaporation film, the problem arises that the antibacterial agent becomes volatile inside the film pack after manufacture and during storage, and it is adsorbed into the filter.

In this regard there arose the requirement of film-packing the filter and the container for the antibacterial agent separately. In order to satisfy this requirement it is desirable for it to be possible to break the seal between the film pack and the container for antibacterial agent and to simply fix the container for antibacterial agent to the filter or to a point adjacent the filter once it has been fitted at when the filter is fitted to the vehicle air conditioning device.

In addition, since the working lives of the filter and that of the antibacterial agent are different, it is also desirable to change them at respective suitable intervals.

In this regard, the purpose of the present invention is to provide a fixing mechanism for a container which satisfies the following (1) it prevents the adsorption of antibacterial agent to the filter during storage, (2) for this reason, makes the container and the filter separable and furthermore makes it possible for the container to be fixed easily to the filter or to a point adjacent the filter once it has been fitted, and (3) makes it possible to change the filter and the antibacterial agent respectively separately with simple operations. In addition, it aims to provide a container which can easily be changed.

[Means for Resolving the Problem]

The fixing mechanism for a container in which an antibacterial agent is sealed according to the present invention is a fixing mechanism for the abovementioned container in a vehicle air conditioning device comprising an air passage which forms an airflow from an air suction port to a purified air discharge port, and in which at least a blower for generating the abovementioned airflow, a filter for removing foreign bodies during the passage of the abovementioned airflow, an evaporator for cooling the abovementioned airflow and a container in which an antibacterial agent is sealed are arranged in said air passage, wherein an inlet/outlet port for the abovementioned filter is provided on the wall surface of the abovementioned air passage, a lid for opening/closing the abovementioned inlet/outlet port is provided, and fixing means for removably fixing the abovementioned container are provided on the inside of the abovementioned air passage inside the wall of said lid.

In the fixing mechanism for a container in which an antibacterial agent is sealed according to the present invention, it is preferable that a concave part is provided on the outer wall surface of either of the walls which is opposite the abovementioned container, and a convex part is provided on the other outer wall surface, the abovementioned fixing means are provided, on the inside of the abovementioned air passage inside the wall of the abovementioned lid, with the concave part and the convex part being provided in a relationship in which they face each other in a matching fashion which are the same shape as the concave part and the convex part of the abovementioned container, and the abovementioned container is removably fixed to the abovementioned lid by fitting the concave part of the abovementioned lid into the convex part of the abovementioned container, and also by fitting the convex part of the abovementioned container into the concave part of the abovementioned lid.

In the fixing mechanism for a container in which an antibacterial agent is sealed according to the present invention, it is preferable that two or more of the abovementioned containers which are the same are integrated in a linear shape by fitting the abovementioned convex part into the abovementioned concave part, and the abovementioned integrated containers are fixed by fitting the convex part of the end of the abovementioned integrated containers into the concave part of the abovementioned lid, and also by fitting the convex part of the abovementioned lid into the concave part of the end of the abovementioned integrated containers. If different kinds of antibacterial agent are arranged inside the HVAC system at the same time, or if the same type of antibacterial agent is arranged therein, it is also possible to increase the number of containers by making it possible for a plurality of containers to be fixed.

The fixing mechanism for a container in which an antibacterial agent is sealed according to the present invention is a system in which a concave part is provided on the outer wall surface of either of the walls opposite the container in which an antibacterial agent is sealed, a convex part is provided on the other outer wall surface, and a concave part and a convex part are provided which are the same shape as the abovementioned concave part and the abovementioned convex part are provided in a relationship in which they face one another in a matching fashion on a filter frame which supports a filter to be positioned in the air passage of a vehicle air conditioning device, and the abovementioned container is fixed to the abovementioned filter frame by fitting the concave part of the abovementioned filter frame into the convex part of the abovementioned container, and also by fitting the convex part of the abovementioned container into the concave part of the abovementioned filter frame.

In the fixing mechanism for a container in which an antibacterial agent is sealed according to the present invention, it is preferable that two or more of the abovementioned containers which are the same are integrated in a linear shape by fitting the abovementioned convex part into the abovementioned concave part, and the abovementioned integrated containers are fixed by fitting the convex part of the end of the abovementioned integrated containers into the concave part of the abovementioned filter frame, and also by fitting the concave part of the abovementioned filter frame onto the convex part of the end of the abovementioned integrated containers. If different kinds of antibacterial agent are arranged at the same time inside the HVAC system, or if the same type of antibacterial agent is arranged therein, then by making it possible for a plurality of containers to be fixed, it is also possible to increase the number of containers.

In the fixing mechanism for a container in which an antibacterial agent is sealed according to the present invention, it is preferable that, in order to distinguish between the upstream flow and downstream flow of the airflow at the time of installation, the abovementioned concave part forms a C-shaped projection and a depression part is formed on the inner side of said C-shaped projection, the abovementioned convex part forms a projection in the shape of a hoop and a normal line which originates at said hoop and extends outwards, or in the shape of an elliptically curved line and a normal line which originates at said elliptically curved line and extends outwards, the abovementioned convex part is fitted into the abovementioned concave part by fitting the projection of the abovementioned hoop or the projection of the abovementioned elliptically curved line into the abovementioned depression part and furthermore, the projection of the abovementioned normal line interlocking with the depression part of the abovementioned C-shaped cut-out section.

In the fixing mechanism for a container in which an antibacterial agent is sealed according to the present invention, it is preferable that the abovementioned container is a container in which one of the mutually facing walls of the pair is made thick, and the other of the walls is made thin and furthermore the wall opposite the upstream side of the abovementioned airflow is made the abovementioned thick wall and the wall opposite the downstream side of the abovementioned airflow is made the abovementioned thin wall. It is possible to regulate excessive volatility in the antibacterial agent.

The container in which an antibacterial agent is sealed according to the present invention is defined in that it is formed from polypropylene resin and at least an antibacterial agent is sealed in the airtight cavity of the container, and furthermore.

In the container in which an antibacterial agent is sealed according to the present invention it is preferable that the abovementioned concave part forms a C-shaped projection and a depression part is formed on the inner side of said C-shaped projection, the abovementioned convex part forms a projection in the shape of a hoop and a normal line which originates at said hoop and extends outwards, or in the shape of an elliptically curved line and a normal line which originates at said elliptically curved line and extends outwards, the abovementioned convex part is fitted into the abovementioned concave part by fitting the projection of the abovementioned hoop or the projection of the abovementioned elliptically curved line into the abovementioned depression part and furthermore, the projection of the abovementioned normal line interlocking with the depression part of the abovementioned C-shaped cut-out section.

In the container in which an antibacterial agent is sealed according to the present invention it is preferable that the abovementioned antibacterial agent is allyl isothiocyanate. Since polypropylene resin is moderately permeable to allyl isothiocyanate the antibacterial agent can easily be made to diffuse steadily inside the HVAC.

[Effect of the Invention]

The present invention can prevent the adsorption of antibacterial agent into the filter during storage. Furthermore, it is a configuration in which the container and the filter can be separated, and also the container can be easily fixed to the filter or to a point adjacent the filter once it has been fitted. In addition, the filter and the antibacterial agent can be changed separately with simple operations.

BRIEF DESCRIPTION OF THE FIGURES

[FIG. 1] is a schematic side surface view of an air passage from the air inlet port to the evaporator in a vehicle air conditioning device for fitting a fixing mechanism for a container according to the present embodiment.

[FIG. 2] is a schematic view of a fixing mechanism for a container according to the present embodiment; (a) is a cross-sectional view along the line A-A' shown in (b); (b) is an enlarged schematic view of the region around the evaporator and the filter unit in FIG. 1.

[FIG. 3] is a schematic view of a fixing mechanism according to the first embodiment where a plurality of containers are fixed; (a) is a process for fixing a plurality of containers to the lid in an integral fashion; (b) shows a plurality of containers fixed integrally to the lid.

[FIG. 4] is a schematic view showing one embodiment of the shape of the concave part and the convex part of the container in which an antibacterial agent has been sealed.

[FIG. 5] is a schematic view of a fixing mechanism for a container according to the second embodiment; (a) is a process for fixing a plurality of containers to the lid in an integral fashion; (b) shows a plurality of containers fixed integrally to the lid.

OPTIMUM EMBODIMENT OF THE INVENTION

The present invention is described below in detail by way of the embodiment, but the present invention is not limited to these disclosures. First of all, a vehicle air conditioning device fitted with a fixing mechanism for a container in which an antibacterial agent has been sealed is described with reference to the present embodiment.

FIG. 1 is a schematic side surface view of the air passage from the air suction port to the evaporator in a vehicle air conditioning device for fitting a fixing mechanism for a container according to the present embodiment. This vehicle air conditioning device 100 is equipped with an air conditioning device main body 10 which forms an air passage. An air inlet port 10a comprising an internal air intake port 10b and an external air intake port 10c which open and close by means of an intake door 11, and an air passage 10d and a purified air discharge port 10f which are connected to the air inlet port 10a are formed in the air conditioning device main body 10. A blower 20 (which constitutes a fan), a filter unit 30 and an evaporator 40 are provided in succession from the upstream side in the air passage 10d. Air is taken in from the open side of the air inlet port 10a inside the air passage 10d when the blower 20 is running. Once this air has passed through the filter unit 30, an air flow 10e which is then cooled by the evaporator 40 is then formed. After this, air is blown out inside the main compartment of the vehicle via an air mix door (not shown), a heater (not shown) and the like.

In FIG. 1 the blower 20, filter unit 30 and evaporator 40 are arranged in that order from upstream of the airflow, but they may be arranged in the order filter unit/evaporator/blower or filter unit/blower/evaporator.

The filter unit 30 is a system for purifying air, and a dust collection filter alone or a filter combining a dust collection filter and a deodorizing filter are included on a filter frame which is fixed to the end part of the filter so that the filter surface does not get covered. In order to make the area of the filter larger, these filters are preferably pleated. Furthermore, where a deodorizing filter is provided, it is even more preferable for a photocatalyst to be provided in the deodorizing filter and for the deodorizing component impregnated in the deodorizing filter to be broken down by an ultraviolet lamp. It should be noted that in order to fix the filter frame to the air conditioning device main body 10 so that it can be removed, a hooking latch (not shown) is preferably provided. By virtue of this, maintenance or changing of any kind of filter is simple. It should be noted that an ultraviolet lamp may be supported on the air conditioning device main body 10 without being fixed to the filter frame, or may be fixed to the filter frame. Furthermore, the filter frame may be divided up in the form of a grid with a filter being included in each of the divided parts inside the frame. Furthermore, a filter alone may be provided, without using a filter frame.

Embodiment 1

The fixing mechanism for the container according to the first embodiment is next described at the time when the container in which an antibacterial agent is sealed is fixed in the vehicle air conditioning device 100. The fixing mechanism for the container in which an antibacterial agent is sealed according to the first embodiment is a fixing mechanism for the abovementioned container in a vehicle air conditioning device comprising at least an air passage which forms an airflow from an air suction port to a purified air discharge port, and in which a blower for generating the abovementioned airflow, a filter for removing foreign bodies during the passage of the abovementioned airflow, an evaporator for cooling the abovementioned airflow and a container in which an antibacterial agent is sealed are arranged in said air passage. And, an inlet/outlet port for the abovementioned filter is provided on the wall surface of the abovementioned air passage, a lid for opening/closing the abovementioned inlet/outlet port is provided, and fixing means for removably fixing the abovementioned container are provided on the inside of the abovementioned air passage inside the wall of said lid.

FIG. 2 is a schematic view of the fixing mechanism of the container according to the first embodiment. FIG. 2(a) is a cross-sectional view along the line A-A' shown by FIG. 2(b). FIG. 2(b) is an enlarged schematic view of the region around the evaporator 40 and the filter unit 30 in FIG. 1. The container 31 in which an antibacterial agent is sealed is fixed inside the air passage 10d of the vehicle air conditioning device 100. To be more specific, a concave part 54 is provided on the outer wall surface 31a of either of the walls opposite the container 31, and a convex part 55 is provided on the outer wall surface 31b of the other wall. On the other hand, an inlet/outlet port 50 for the filter unit 30 is provided on the wall surface of the air conditioning device main body 10 which separates it from the air passage 10d, and a lid 51 is also provided for opening and closing the inlet/outlet port 50. Then, a concave part 54 and a convex part 55, and a similarly-shaped concave part 56 and a similarly-shaped convex part 57 are arranged in a relationship in which they face one another in a matching fashion on the wall surface of the lid 51. This is the means for fixing the container 31. Then, the container 31 is removably fixed by fitting the concave part 54 of the container 31 onto the convex part 57 of the lid 51, and furthermore by fitting the convex part 55 of the container 31 into the concave part 56 of the lid 51. The fixing mechanism according to the first embodiment fixes the container 31 to the inner wall side of the lid 51 by means of fixing means 53 with which the concave part 56 and the convex part 57 of the lid 51 are fitted.

The concave part 56 and the convex part 57 of the lid 51 and the convex part 55 and the concave part 54 of the container 31 are preferably fitted in order to fix the assembly. If the container 31 is bonded with an adhesive or double-sided tape, there is a risk that the adhesive may deteriorate on account of the antibacterial component and it may become detached.

FIG. 2 shows the case of one container fixed by fitting, but embodiments in which a plurality of containers are fitted to the inner wall surface side of the lid are also possible. FIG. 3 shows a schematic view of the fixing mechanism according to the first embodiment in which a plurality of containers are fixed. FIG. 3(a) shows the process for fixing a plurality of containers to the lid in an integral fashion; FIG. 3(b) shows a plurality of containers fixed integrally to the lid. First of all, two or more containers 31 which are the same are integrated in a linear shape by fitting the convex part 55 into the concave part 54 (FIG. 3(a)). Next, the convex part 55 of the end of the integrated containers is fitted into the concave part 56 of the lid 51, and also the convex part 57 of the lid 51 is fitted into the concave part 54 of the end of the integrated containers. By means of this, the integrated containers are fixed to the lid 51 (FIG. 3(b)). It is possible to make the lid 51 a suitable size by regulating the number of small containers.

Next, a specific example of the structure of the concave part 54 and the convex part 55 of the container 31 and the concave part 56 and the convex part 57 of the lid 51 is disclosed, and the interlocking mechanism thereof is described. The concave part of the container 31 and the concave part 56 of the lid 51 are the same shape, and furthermore the convex part 55 of the container 31 and the convex part 57 of the lid 51 are the same shape. Accordingly, the concave part 54 and the convex part 55 of the container 31 will be described here as an example. FIG. 4 is a schematic view showing one embodiment of the shape of the concave part 54 and the convex part 55 of the container 31. By forming a C-shaped projection 58, the concave part 54 forms a depression part 59 on the inner side of the C-shaped projection, and the convex part 55 forms a projection 62 in the shape of a hoop 60 and a normal line 61 which originates at the hoop 60 and extends outwards. Then, the concave part 54 and the convex part 55 are fitted by insert-fitting the projection of the hoop 60 into the depression part 59 and furthermore by interlocking the projection of the normal line 61 with the depression part of the C-shaped cut-out section 63. By virtue of the fact that the projection of the normal line 61 interlocks with the depression part of the C-shaped cut-out section 63, the positional relationship to the direction of rotation when the concave part and the convex part are fitted can be decided as a fixed relationship. It should be noted that the convex part 55 may form a projection, the shape of which is an elliptically curved line and a normal line which originates at said elliptically curved line and extends outwards (not shown). In this case, the shape of the depression part 59 of the concave part 54 is made the same shape as the elliptically curved line.

In this embodiment, the reason for fixing the container 31 in which an antibacterial agent has been sealed to the lid 51 of the inlet/outlet port 50 of the filter unit 30 is that because a dedicated inlet/outlet port for the container 31 in which an antibacterial agent has been sealed has been omitted and combined use is made thereof, and the evaporator creates an environment which favors proliferation of microorganisms on account of the condensation, then if the filter unit 30 is arranged adjacent the evaporator 40, proliferation of microorganisms is prevented through the sustained release of antibacterial agent into the evaporator and the area around it.

The antibacterial agents which can be used are any antibacterial agent that is volatile at room temperature. These may be, for example, *Chamaecyparis taiwanensis* (Taiwanese cypress), cinnamaldehyde, and isothiocyanates, but allyl isothiocyanate is especially preferable for the reason that it possesses antibacterial effects at low concentrations, and it has properties which make it able to permeate synthetic polymers as a gas. In this embodiment, allyl isothiocyanate is adsorbed into a carrier which is a porous medium, such as zeolite, or impregnated into a water-absorbent polymer and the carrier is sealed in a container made from a synthetic polymer and then put to use. The material of the container is preferably polypropylene which is gas permeable to allyl isothiocyanate by osmotic diffusion. The lid is completely sealed by ultrasonic deposition without providing any air holes.

The container 31 in which at least an antibacterial agent has been sealed in the sealed cavity container is preferably formed and fixed in such a way that the walls are less thick on the downstream airflow side than the walls on the upstream airflow side. When airflow reaches the walls on the upstream airflow side, the antibacterial agent which can permeate as a gas quickly dissipates from the wall surface. Since gas permeability concerns diffusion along a concentration gradient, if the antibacterial agent adsorbed in the wall surface separates quickly in a gas permeable area, the concentration of antibacterial agent in the wall surface drops and the antibacterial agent is better able to permeate as a gas. The antibacterial agent is better able to prevent the proliferation of microorganisms by sustained release into the evaporator and the area around it when the vehicle air conditioning device is not functioning and no airflow is generated in the air passage, rather than when the vehicle air conditioning device is actually running. Accordingly it is desirable for the container to have-features which prevent the antibacterial agent from being better able to permeate as a gas due to airflow, and it is desirable for more antibacterial agent to vaporize toward the evaporator. When the walls are thicker on the upstream flow side, the ability of the antibacterial agent to permeate as a gas is markedly less and even if there is airflow, the slight effect thereof is determined by the thickness of the walls. For example, the wall thickness is 1.6-3.0 mm, preferably 1.8-2.2 mm. On the other hand, even if the walls of a container in which there is less tendency toward airflow are thin on the downstream flow side, it is possible for there to be sustained release of antibacterial agent oriented toward the evaporator side by making the wall thinner without the airflow making the antibacterial agent more volatile. It should be noted that even if the temperature inside the air passage in the walls on the downstream flow side of the container reaches the order of 50 degree C., the thickness of the walls is determined so that the ability of the antibacterial agent to permeate as a gas does not exceed the required amount. For example, the wall thickness is 0.4-1.2 mm, preferably 0.6-1.0 mm. Since, as explained above, it is possible in this embodiment to allow the sustained release of the antibacterial agent only in the required direction, the life of the antibacterial agent may be lengthened. Furthermore, the shape of the attached container 31 is preferably made as an abbreviated C-shaped concave part and as a convex part which interlocks therewith. The C-shaped cut-out section determines the direction of attachment.

Second Embodiment

A fixing mechanism for a container according to a second embodiment is described next when a container in which an antibacterial agent is sealed is fixed to a vehicle air conditioning device 100. FIG. 5 is a schematic view of the fixing mechanism for a container according to the second embodiment. FIG. 5(*a*) shows the process for integrating a plurality of containers and fixing them to a filter frame; FIG. 5(*b*) shows a plurality of containers fixed integrally to the filter frame. FIG. 5 shows an embodiment in which a plurality of containers are made integral and simultaneously fixed to a filter frame, but in the same way as in the first embodiment, a single container in which an antibacterial agent is sealed may be fixed. The container 31 in which an antibacterial agent is sealed which is fixed to the filter frame 32 is fixed inside the airflow passage 10*d* in the vehicle air conditioning device in the same way as in the first embodiment. In FIG. 5(*a*) two or more containers 31 which are the same are integrated in a linear shape, as in the first embodiment. In other words, a concave part 54 is provided on the outer wall surface 31*a* of either of the walls opposite the container 31 in which an antibacterial agent is sealed, and a convex part 55 is provided on the outer wall surface 31*b* of the other wall. On the other hand the concave part 54 and the convex part 55 which are the same shape as the concave part 71 and the convex part 70 are provided in a relationship in which they face each other in a matching fashion on a filter frame 32 which supports the filter 33 to be positioned in the air passage of a vehicle air conditioning device. The concave part 71 and the convex part 70 of the filter frame 32 are arranged in the extension part of the filter frame. Then, the container 31 is fitted to the filter frame 32 by fitting the concave part 54 of the container 31 onto the convex part 70 of the filter frame 32, and furthermore by fitting the convex part 55 of the container 31 into the concave part 71 of the filter frame 32. In other words, the fixing mechanism according to the second embodiment is a system in which the container 31 is fixed to the filter frame 32. As in the first embodiment, because the container 31 is insert-fitted into the filter frame 32, there is no phenomenon of adhesive deterioration even if there is an antibacterial agent present, and no risk of detachment.

The structure of the concave part 54 and convex part 55 of the container 31, and the concave part 71 and convex part 70 provided on the filter frame is preferably the same structure as in the first embodiment: the concave part 54 and convex part 55 of the container 31, and the concave part 56 and convex part 57 of the lid 51.

In the second embodiment the reason for fixing the container 31 in which an antibacterial agent has been sealed to the filter frame 32 is that because the evaporator creates an environment which favors proliferation of microorganisms on account of the condensation, if the filter 33 is arranged adjacent the evaporator 40, proliferation of microorganisms is prevented through the sustained release of antibacterial agent into the evaporator and the area around it.

The antibacterial agent and the container in which it is sealed are the same as that which appears in the first embodiment. Furthermore, as in the first embodiment, the container 31 in which at least an antibacterial agent has been sealed in the sealed cavity container is preferably formed and fixed in such a way that the walls are less thick on the downstream airflow side than the walls on the upstream airflow side. In addition, the specific example of the shape of the concave part and the convex part is the same as in the first embodiment.

In this embodiment, the container and the filter are made separable and furthermore it is possible for the container to be easily fixed to the filter or to a point adjacent the filter once it has been fitted. Accordingly, it is possible to package the filter and the antibacterial agent-containing container separately. Accordingly, it is possible to prevent adsorption of the antibacterial agent to the filter during storage. In addition, it is possible to change the filter and the antibacterial agent respectively separately with simple operations.

This embodiment shows a plurality of containers in which an antibacterial agent has been sealed integrated in a linear shape, but in this case a container containing a fragrance instead of an antibacterial agent may be mixed. At this time, fine holes are preferably provided in the container so that the fragrance can vaporize to the outer part of the container without sealing the fragrance-containing container.

KEY

100 vehicle air conditioning device
10 air conditioning device main body
11 intake door
10*a* air inlet port
10*b* internal air intake port
10*c* external air intake port
10*d* air passage
10*f* purified air discharge port
20 blower
30 filter unit
31 container in which an antibacterial agent has been sealed
32 filter frame
33 filter
40 evaporator
50 inlet/outlet port
51 lid
52 inside of the air passage
53 fixing means
31*a*, 31*b* outer wall surface of the container
54, 56, 71 concave part
55, 57, 70 convex part
58 C-shaped projection
59 depression part on the inner side of the C-shaped projection
60 hoop
61 normal line
62 projection
63 C-shaped cut-out section
72 filter frame extension part

The invention claimed is:

1. A fixing mechanism of a container in a vehicle air conditioning device main body comprising an air passage for an airflow from an air inlet port to a purified air discharge port, and comprising at least:
   a blower for generating the airflow,
   a filter unit for purifying air during the passage of the airflow,
   an evaporator for cooling the airflow
   at least one container containing at least one of an antibacterial agent and a fragrance agent arranged in the air passage,
   an inlet/outlet port for accessing the filter unit and defined by a wall surface of the main body, and
   a lid removably coupled to the main body for covering the inlet/outlet port wherein one of a filter frame arranged on the filter unit and the lid includes a first concave part and a first convex part spaced from the first concave part for receiving the at least one container therebetween and wherein the container includes a second concave part identical in shape to the first concave part and disposed on an end of the at least one container and further includes a second convex part identical in shape to the first convex part and disposed on an end of the at least one container opposite from the second concave part with the second concave part mating with the first convex part and the second convex part mating with the first concave part to define fixing means for removably fixing the container within the air passage,
   wherein the first concave part and the second concave part include a projection forming a depression part internally therein, and
   wherein the first convex part and the second convex part include a projection that interlocks with the depression part of the first and second concave parts.

2. The fixing mechanism according to claim 1 wherein the at least one container includes at least two containers integrated into a linear shape by fitting the second concave part of one of the two containers into the second convex part of the other of the two containers to form an integrated container which has a first end presenting one second concave part for mating with the first convex part and a second end presenting one second convex part for mating with the first concave part.

3. The fixing mechanism according to claim 1 wherein the lid includes the first concave part and the first convex part with the container coupled to the lid by mating the second concave part with the first convex part and the second convex part with the first concave part.

4. The fixing mechanism according to claim 1 wherein the filter frame includes the first concave part and the first convex part with the container coupled to the filter frame by mating the second concave part with the first convex part and the second convex part with the first concave part.

5. The fixing mechanism according to any of the preceding claims wherein the projection of the first concave part and the second concave part is further defined as a C-shaped projection forming a depression part on the inner side of the C-shaped projection and wherein the projection of the first convex part and the second convex part is in the shape of one of a hoop having a normal line which originates at the hoop and extends outward therefrom and an elliptically curved line having a normal line which originates at the elliptically curved line and extends outwards therefrom.

6. The fixing mechanism according to claim 1 wherein the container includes a upstream wall disposed on an upstream side of the airflow and a downstream wall disposed on a downstream side of the airflow with the downstream wall having a wall thickness less than a thickness of the upstream wall.

7. The fixing mechanism according to claim 1 wherein the antibacterial agent contained within the container includes allyl isothiocyanate.

8. The fixing mechanism according to claim 5 wherein the concave parts mate with the convex parts by fitting the projection of the convex parts into the depression part of the concave parts such that the normal lines of the convex parts interlock with the depression of the C-shaped cut-out-section.

* * * * *

UNITED STATES PATENT AND TRADEMARK OFFICE
CERTIFICATE OF CORRECTION

PATENT NO.       : 7,621,807 B2
APPLICATION NO.  : 11/325580
DATED            : November 24, 2009
INVENTOR(S)      : Hara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 744 days.

Signed and Sealed this

Twenty-sixth Day of October, 2010

David J. Kappos
*Director of the United States Patent and Trademark Office*